US012748893B2

(12) United States Patent
Mu et al.

(10) Patent No.: US 12,748,893 B2
(45) Date of Patent: Sep. 29, 2026

(54) METHOD AND APPARATUS FOR DATA VERIFICATION

(71) Applicant: DIGITAL CURRENCY INSTITUTE, THE PEOPLE'S BANK OF CHINA, Beijing (CN)

(72) Inventors: Changchun Mu, Beijing (CN); Gang Di, Beijing (CN); Youcai Qian, Beijing (CN); Jinzhao Du, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 214 days.

(21) Appl. No.: 18/575,872

(22) PCT Filed: Jun. 10, 2022

(86) PCT No.: PCT/CN2022/098118
§ 371 (c)(1),
(2) Date: Jan. 1, 2024

(87) PCT Pub. No.: WO2023/273832
PCT Pub. Date: Jan. 5, 2023

(65) Prior Publication Data

US 2024/0354878 A1 Oct. 24, 2024

(30) Foreign Application Priority Data

Jul. 2, 2021 (CN) ......................... 202110752705.9

(51) Int. Cl.
*G06Q 50/18* (2012.01)
*G06F 21/62* (2013.01)
(Continued)

(52) U.S. Cl.
CPC .......... *G06F 21/64* (2013.01); *G06F 21/6245* (2013.01); *G06Q 10/40* (2026.01); *G06Q 50/18* (2013.01)

(58) Field of Classification Search
None
See application file for complete search history.

(56) References Cited

U.S. PATENT DOCUMENTS

2018/0365686 A1* 12/2018 Kondo .................. H04L 9/3239
2019/0081796 A1* 3/2019 Chow ..................... G06Q 20/34
(Continued)

FOREIGN PATENT DOCUMENTS

CN 107425982 A 12/2017
CN 108898490 A 11/2018
(Continued)

OTHER PUBLICATIONS

Tolmach, P., Li, Y., Lin, S. W., Liu, Y., & Li, Z. ,Apr. 19, 2021, A survey of smart contract formal specification and verification ACM Computing Surveys (CSUR), 54, 7, pp. 1-40. (Year: 2021).*

*Primary Examiner* — Michael J. Monaghan
(74) *Attorney, Agent, or Firm* — The Sun IP Law

(57) ABSTRACT

The present disclosure discloses a method and an apparatus for data verification, and relates to the field of computer technology. A implementation of the method includes: performing a first verification on data-to-be-verified, where the data-to-be-verified includes a first contract parameter, a identifier of the smart contract, and a first execution result; processing, after the first verification is passed, the first contract parameter to obtain second contract parameter, and executing a smart contract based on the second contract parameter to obtain a second execution result; and sending the second contract parameter, the identifier of the smart
(Continued)

contract, and the second execution result to a consensus verification node for a consensus verification.

16 Claims, 4 Drawing Sheets

(51) Int. Cl.

| | |
|---|---|
| ***G06F 21/64*** | (2013.01) |
| ***G06Q 10/40*** | (2026.01) |

(56) References Cited

U.S. PATENT DOCUMENTS

| | | | | |
|---|---|---|---|---|
| 2020/0036519 | A1* | 1/2020 | Bitauld | H04L 9/0897 |
| 2020/0134613 | A1* | 4/2020 | Jiang | G06Q 20/3825 |
| 2020/0252202 | A1* | 8/2020 | Madl | H04L 63/12 |
| 2020/0279257 | A1* | 9/2020 | Cheng | H04L 9/3239 |
| 2020/0342092 | A1* | 10/2020 | Wei | G06F 21/6218 |
| 2021/0044976 | A1* | 2/2021 | Avetisov | H04W 12/08 |
| 2021/0065324 | A1* | 3/2021 | Zhao | G06F 21/16 |
| 2021/0090108 | A1* | 3/2021 | Moreno Molina | G06Q 20/387 |
| 2021/0152369 | A1* | 5/2021 | Xie | H04L 63/12 |
| 2021/0182872 | A1* | 6/2021 | Cheng | H04L 63/0823 |
| 2021/0314136 | A1* | 10/2021 | Huang | G16Y 40/10 |
| 2021/0314155 | A1* | 10/2021 | Novotny | G06F 16/27 |
| 2022/0067715 | A1* | 3/2022 | Deng | G06Q 20/3827 |
| 2022/0207022 | A1* | 6/2022 | Wood | G06F 16/2379 |
| 2022/0239508 | A1* | 7/2022 | Liu | H04L 9/50 |
| 2023/0362015 | A1* | 11/2023 | Kayaba | H04L 9/3239 |
| 2023/0396445 | A1* | 12/2023 | Padmanabhan | H04L 9/50 |

FOREIGN PATENT DOCUMENTS

| | | | |
|---|---|---|---|
| CN | 109345388 | A | 2/2019 |
| CN | 110233823 | A | 9/2019 |
| CN | 110599177 | A | 12/2019 |
| CN | 111311255 | A | 6/2020 |
| CN | 111801910 | A | 10/2020 |
| CN | 111899019 | A | 11/2020 |
| CN | 112398949 | A | 2/2021 |
| CN | 113037863 | A | 6/2021 |
| CN | 113592645 | A | 11/2021 |
| WO | 2020058966 | A1 | 3/2020 |

* cited by examiner

METHOD AND APPARATUS FOR DATA VERIFICATION

CROSS-REFERENCE TO RELATED APPLICATION

The present disclosure claims the priority of Chinese Patent Application No. 202110752705.9, entitled “Method and Apparatus for Data verification”, filed on Jul. 2, 2021, the entire content of which is incorporated herein by reference as part or all of the present disclosure.

TECHNICAL FIELD

The present disclosure relates to the field of computer technology, and in particular to a method and an apparatus for data verification.

BACKGROUND

The basic characteristics of a smart contract include: consistency, customization, observability, verifiability, enforceability, and privacy protection. Verifiability refers to the ability of a client to prove to an arbitrator the performance or breach of the contract, or the ability of the arbitrator to ascertain this point through other means. In order to ensure the accuracy of execution results of the smart contract, it is necessary to verify the execution results of the smart contract. However, how to ensure the credibility of verifying the execution results of the smart contracts is currently a pressing technical problem that needs to be solved.

SUMMARY

In view of this, embodiments of the present disclosure provide a method and an apparatus for data verification. A mechanism of multi-node joint verification ensures the accuracy of a contract execution result, and avoids the situation that an operating agency system is in charge of both contract execution and contract verification, causing the low credibility of verification of a smart contract, thereby improving the credibility of contract execution and verification.

In order to achieve the above objectives, according to an aspect of this embodiment of the present disclosure, a method for data verification is provided.

The method for data verification includes:

performing a first verification on data-to-be-verified, where the data-to-be-verified includes a first contract parameter, an identifier of a smart contract, and a first execution result;

processing, after the first verification is passed, the first contract parameter to obtain a second contract parameter, and executing the smart contract according to the second contract parameter to obtain a second execution result; and sending the second contract parameter, the identifier of the smart contract, and the second execution result to a consensus verification node for a consensus verification.

Optionally, performing the first verification on data-to-be-verified includes:

acquiring the smart contract according to the identifier of the smart contract;

executing the smart contract according to the first contract parameter to obtain a third execution result;

comparing the third execution result with the first execution result for the first verification.

Optionally, each consensus verification node performs the consensus verification through the following method:

acquiring the smart contract according to the identifier of the smart contract;

executing the smart contract according to the second contract parameter to obtain a fourth execution result;

comparing the fourth execution result with the second execution result to obtain a second verification result.

Optionally, the consensus verification includes:

determining whether a set condition for reaching set condition for reaching consensus has been met according to a second verification result of each consensus verification node;

in response to the set condition for reaching consensus being met, indicating the consensus verification is successful;

in response to the set condition for reaching consensus not being met, indicating that the consensus verification is failed.

Optionally, the processing the first contract parameter to obtain the second contract parameter includes:

desensitizing the first contract parameter to obtain the second contract parameter.

According to another aspect of this embodiment of the present disclosure, an apparatus for data verification is provided.

The apparatus for data verification includes:

a first verification module, configured to perform a first verification on data-to-be-verified, where the data-to-be-verified includes a first contract parameter, an identifier of a smart contract, and a first execution result;

a contract execution module, configured to process, after the first verification is passed, the first contract parameter to obtain a second contract parameter, and execute the smart contract according to the second contract parameter to obtain a second execution result;

a second verification module, configured to send the second contract parameter, the identifier of the smart contract, and the second execution result to a consensus verification node for a consensus verification.

According to another aspect of this embodiment of the present disclosure, a method for data verification is provided.

The method for data verification includes:

sending, by a contract execution unit of an operating agency system, a first contract parameter, a identifier of the smart contract, and a first execution result to a contract verification unit of the operating agency system for a first verification;

performing the first verification by the contract verification unit of the operating agency system, processing, after the first verification is passed, the first contract parameter to obtain a second contract parameter, and executing the smart contract according to the second contract parameter to obtain a second execution result; sending the second contract parameter, the identifier of the smart contract, and the second execution result to a consensus verification node;

performing, by the consensus verification node, a consensus verification according to the second contract parameter, the identifier of the smart contract, and the second execution result.

According to another aspect of this embodiment of the present disclosure, an electronic device for data verification is provided.

The electronic device for data verification includes: at least one processor; and a storage apparatus configured to store at least one program. The at least one program, when executed by the at least one processor, enable the at least one processor to implement the data verification method provided in this embodiment of the present disclosure.

According to another aspect of this embodiment of the present disclosure, a computer-readable medium is provided.

The computer-readable medium stores a computer program. The program, when executed by a processor, implements the data verification method provided in this embodiment of the present disclosure.

Further effects of the foregoing non-conventional optional modes will be explained below by combining implementations.

BRIEF DESCRIPTION OF THE DRAWINGS

The accompanying drawings are used for a better understanding of the present disclosure, which do not constitute improper limitations on the present disclosure.

DETAILED DESCRIPTION OF THE EMBODIMENTS

Exemplary embodiments of the present disclosure are illustrated in conjunction with the accompanying drawings below, and various details of the embodiments of the present disclosure are included to facilitate understanding, which should be considered purely exemplary. Thus, those of ordinary skill in the art should realize that the embodiments described herein can be variously transformed and modified, which cannot depart from the scope and spirit of the present disclosure. Similarly, for clarity and brevity, descriptions of well-known functions and structures are omitted in the following descriptions.

In the process of executing a smart contract, after a smart contract execution unit executes the smart contract according to a contract parameter to obtain an execution result, a smart contract verification unit verifies the execution result. In order to solve the problem about how to ensure the credibility of verifying the execution result of the smart contract, the present disclosure employs a mechanism of multi-node joint verification to ensure the accuracy of the contract execution result, which prevents the situation that an operating agency system is in charge of both contract execution and contract verification, therefore avoids self-verification, and improves the credibility of contract execution and verification. Typically, the smart contract verification unit and the smart contract execution unit of the same smart contract operating agency system, such as a bank or a company, are usually associated. Multiple joint verification nodes refer to smart contract execution units of multiple operating agency systems.

Figure 1:
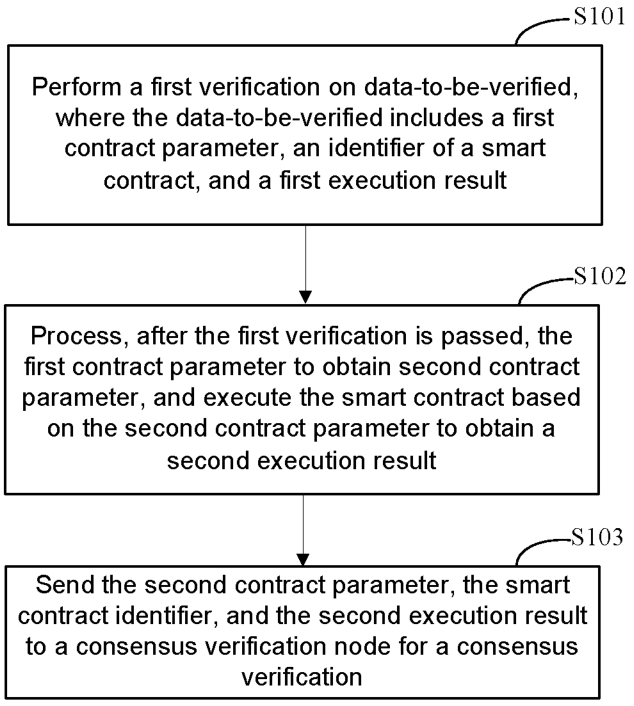
FIG. 1 is a schematic diagram of main steps of a method for data verification according to an embodiment of the present disclosure.

FIG. 1 is a schematic diagram of main steps of a data verification method according to an embodiment of the present disclosure. As shown in FIG. 1, the data verification method in this embodiment of the present disclosure mainly includes step S101 to step S103 below.

At step S101: perform a first verification on data-to-be-verified, where the data-to-be-verified includes a first contract parameter, an identifier of a smart contract, and a first execution result.

At step S102: after the first verification is passed, process the first contract parameter to obtain a second contract parameter, and execute the smart contract based on the second contract parameter to obtain a second execution result.

At step S103: send the second contract parameter, the identifier of the smart contract, and the second execution result to a consensus verification node for a consensus verification.

In this embodiment of the present disclosure, multi-node data verification is implemented through a consensus mechanism. The term "consensus mechanism" refers to a process where verification and confirmation of transactions are achieved through voting by specialized nodes in a short period of time. For a transaction, if a consensus can be reached by several nodes with unrelated benefits, it can be considered that the entire network can also reach a consensus on that.

According to the step S101 to the step S103, joint contract execution and verification can be achieved by a contract verification platform composed of multiple verification nodes, thereby improving the credibility of contract execution and verification.

According to an embodiment of the present disclosure, during execution, the step of performing a first verification on data-to-be-verified may include: the smart contract is acquired according to the identifier of the smart contract; the smart contract is executed according to the first contract parameter to obtain a third execution result; and the third execution result and the first execution result are compared so as to perform the first verification. In this embodiment, the contract parameter and the execution results of the smart contract execution unit are sent to the smart contract verification unit of the operating agency system corresponding to the smart contract execution unit for a preliminary verification. The execution results can be preliminarily verified before the smart contract verification units of the plurality of different operating agency systems perform the consensus verification, and after the preliminary verification is successful, the consensus verification is performed, thereby saving the verification cost, and improving the verification efficiency.

After the first verification is successful, the first contract parameter is processed to obtain the second contract parameter, and the processing of the first contract parameter herein is, for example, desensitization. Because user data needs to be kept confidential between different operating agency systems such as banks or companies, when the multiple consensus verification nodes perform the consensus verification, data desensitization processing is also required to be performed on contract parameter sent to the multiple consensus verification nodes. The desensitization may be typically performed by methods such as data substitution, data obfuscation, data randomization, and data masking. In this embodiment of the present disclosure, the data desensitization processing is performed on the first contract parameter by performing a hash operation on the first contract parameter.

According to another embodiment of the present disclosure, each consensus verification node may be verified by a following method: the smart contract is acquired according to the identifier of the smart contract; the smart contract is executed according to the second contract parameter to obtain a fourth execution result; and the fourth execution result and the second execution result are compared to obtain a second verification result. The consensus verification node execute the smart contract according to the processed second contract parameter, and can verify the contract execution result without obtaining original contract parameter, thereby ensuring privacy and data security of contract parities, and also realizing multi-party joint verification.

According to another embodiment of the present disclosure, the step of consensus verification includes: whether a set condition for reaching set condition for reaching consensus has been met is determined according to a second verification result of each consensus verification node; and in response to the set condition for reaching consensus being met, the consensus verification is successful; in response to the set condition for reaching consensus not being met, the consensus verification is failed. The set condition for reaching consensus may be flexibly set according to requirements of data verification. For example, it may be set that the consensus verification is successful when verification results from more than half of the consensus verification nodes are positive.

Figure 2:
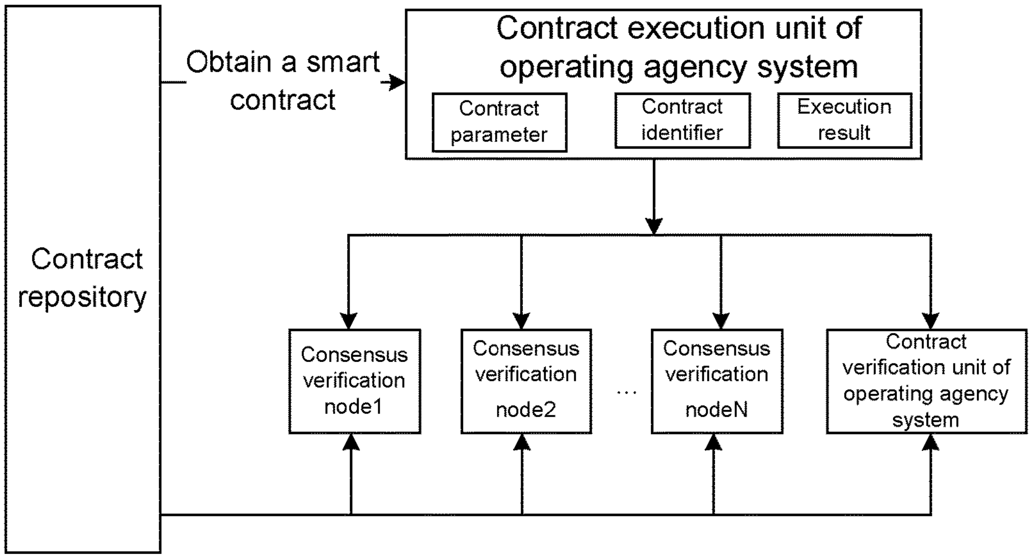
FIG. 2 is a schematic diagram of a system principle of data verification according to an embodiment of the present disclosure.

The implementation process of this embodiment of the present disclosure is introduced in conjunction with specific embodiments below. FIG. 2 is a schematic diagram of a system principle of data verification according to an embodiment of the present disclosure. As shown in FIG. 2, after contract execution is completed, a contract execution unit of an operating agency system respectively sends contract parameter, a contract identifier, and a real operation record that includes a contract execution result to a contract verification platform composed of contract verification units of a plurality of operating agency systems for a consensus verification of the contract execution result. The contract verification unit of each operating agency system is a consensus verification node (e.g., consensus verification node 1 to N in the figure). In the contract verification process, each consensus verification node can obtain the smart contract from a contract repository according to the identifier of the smart contract. Each consensus verification node can execute the smart contract based on the contract parameter (required to be subjected to data desensitization) when performing execution result verification. When processing is performed on a database and funds in a digital currency wallet, the latest desensitized wallet data can be extracted from a local wallet historical stacked repository of the verification platform. Calculation processing is performed according to the real operation record so as to obtain a contract execution result, and the calculated desensitized wallet information is then appended to the wallet historical stacked repository, serving as a data basis for the next verification.

Figure 3:
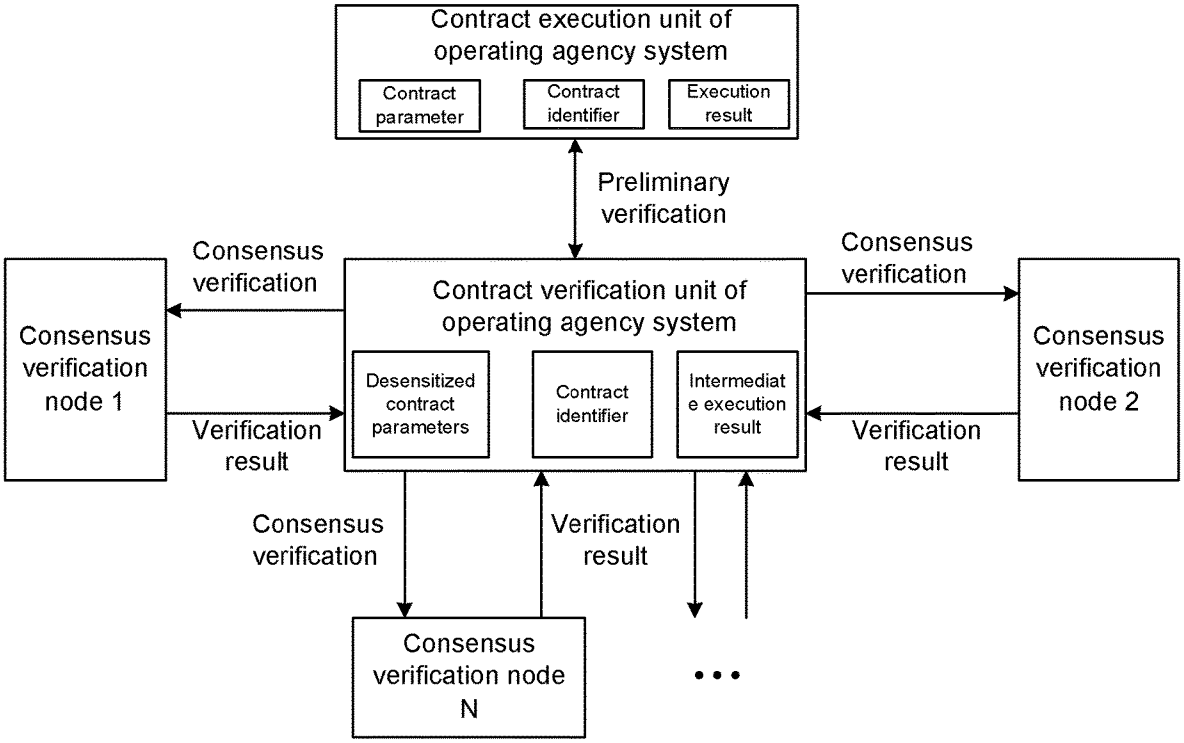
FIG. 3 is a schematic diagram of a principle of a consensus verification mechanism according to an embodiment of the present disclosure.

FIG. 3 is a schematic diagram of a principle of a consensus verification mechanism according to an embodiment of the present disclosure. When a smart contract execution unit of an operating agency system verifies an execution result, a smart contract verification unit of the operating agency system first performs a preliminary verification; after the preliminary verification is successful, the smart contract is executed again according to desensitized contract parameter to obtain an intermediate execution result; and then, the desensitized contract parameter and the intermediate execution result are sent to smart contract verification units (i.e., consensus verification nodes) of other operating agency systems participating in consensus verification, verification results (pass/fail) of the consensus verification nodes are collected, and whether consensus is reached or not is judged according to the set condition for reaching consensus. For example, if the consensus verification nodes of the operating agency systems produce the same result after the contract verification and execution, that is, the consensus verification nodes reach the consensus, it signifies that the contract execution and verification are successful. During the implementation, it is not necessarily required for all consensus verification nodes to have the same results in order to reach the consensus. In an embodiment, the set condition for reaching consensus can be flexibly set according to disclosure requirements.

In an embodiment of the present disclosure, when a smart contract execution unit of an operating agency system needs to verify a contract execution result, firstly, the first contract parameter (including involved wallet information, interface parameter required for the contract execution, etc.), a identifier of the smart contract ID, and a real operation record (or a hash value) including a smart contract first execution result to a smart contract verification unit of this operating agency system for the first verification. The smart contract verification unit of this operating agency system obtains, according to the identifier of the smart contract, the smart contract from the contract repository, mock operation is performed on the smart contract according to the first contract parameter to obtain a third execution result, and the third execution result and the first execution result are compared for the first verification. If the first verification is successful, it indicates that the preliminary verification of the smart contract verification unit of this operating agency system on the execution result of the smart contract execution unit is positive, thereby performing the subsequent consensus verification. If the first verification is not successful, a verification failure is directly returned, and the subsequent consensus verification is not performed, such that the smart contract execution unit performs rollback processing and re-execution. The mock operation is similar to black-box testing, and belongs to a kind of verification method that since the smart contract verification unit cannot replicate a real smart contract execution environment, an operation environment is simulated, and in order not to influence the verification result, certain parameters are preset, and only the parameters of concern are adopted as input parameters for input.

After the first verification is successful, a smart contract verification platform of this operating agency system uses the hashing algorithm to desensitize the first contract parameter to obtain the second contract parameter, and then uses the second contract parameter to execute the smart contract to obtain the second execution result.

Then, the smart contract verification platform of this operating agency system sends the second contract parameter, the identifier of the smart contract, and the second execution result to the consensus verification nodes. Each consensus verification node obtains the smart contract from the contract repository, then uses the second contract parameter to execute the smart contract to obtain the fourth execution result, and compares the fourth execution result with the second execution result for the second verification. If the fourth execution result is consistent with the second execution result, the verification is successful (alternatively, the verification result of the consensus verification node may be considered "agreed"); If the fourth execution result is not consistent with the second execution result, the verification is failed.

Finally, the second verification results of all the consensus verification nodes are collected, and whether consensus is reached is judged according to the set condition for reaching consensus, where the set condition for reaching consensus may be, for example, the number of consensus verification nodes with successful verification exceeding half of the total number of all the consensus verification nodes. If consensus is reached, the consensus verification is successful; if consensus is not reached, the consensus verification is failed. In case of the verification failure, the smart contract execution unit performs rollback processing and re-execution.

Figure 4:
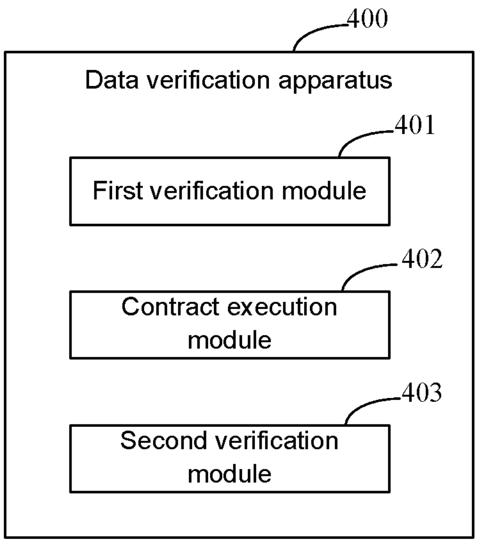
FIG. 4 is a schematic diagram of main modules of an apparatus for data verification according to an embodiment of the present disclosure.

FIG. 4 is a schematic diagram of main modules of an apparatus for data verification according to an embodiment of the present disclosure. As shown in FIG. 4, the apparatus for data verification 400 in this embodiment of the present disclosure mainly includes a first verification module 401, a contract execution module 402, and a second verification module 403.

The first verification module 401 is configured to perform a first verification on data-to-be-verified, where the data-to-be-verified includes a first contract parameter, an identifier of a smart contract, and a first execution result.

The contract execution module 402 is configured to process, after the first verification is passed, the first contract parameter to obtain a second contract parameter, and execute the smart contract based on the second contract parameter to obtain a second execution result.

The second verification module 403 is configured to send the second contract parameter, the identifier of the smart contract, and the second execution result to a consensus verification node for a consensus verification.

According to an embodiment of the present disclosure, the first verification module 401 may be further configured to:

- acquire the smart contract according to the identifier of the smart contract;
- execute the smart contract according to the first contract parameter to obtain a third execution result;
- compare the third execution result with the first execution result for the first verification.

According to another embodiment of the present disclosure, each consensus verification node performs the consensus verification through the following method:

- the smart contract is acquired according to the identifier of the smart contract;
- the smart contract is executed according to the second contract parameter to obtain a fourth execution result;
- the fourth execution result is compared with the second execution result to obtain a second verification result.

According to another embodiment of the present disclosure, the second verification module 403 may be further configured to:

- determine whether a set condition for reaching set condition for reaching consensus has been met according to a second verification result of each consensus verification node;
- in response to the set condition for reaching consensus being met, indicate the successful consensus verification is successful;
- in response to the set condition for reaching consensus not being met, indicate that the consensus verification is failed.

According to another embodiment of the present disclosure, the contract execution module 402 may be further configured to:

- desensitize the first contract parameter to obtain the second contract parameter.

According to the technical solution of this embodiment of the present disclosure, the first verification is performed on the data-to-be-verified, and the data-to-be-verified includes the first contract parameter, the identifier of the smart contract, and the first execution result; after the first verification is successful, the first contract parameter are processed to obtain the second contract parameter, and the smart contract is executed according to the second contract parameter to obtain the second execution result; and the second contract parameter, the identifier of the smart contract, and the second execution result are sent to the consensus verification node for the consensus verification, thereby realizing joint contract execution and verification by the contract verification platform composed of the plurality of verification nodes. The mechanism of multi-node joint verification ensures the accuracy of the contract execution result, and avoids the situation that an operating agency system is in charge of both contract execution and contract verification, causing the low credibility of verification of the smart contract, thereby improving the credibility of contract execution and verification.

Figure 5:
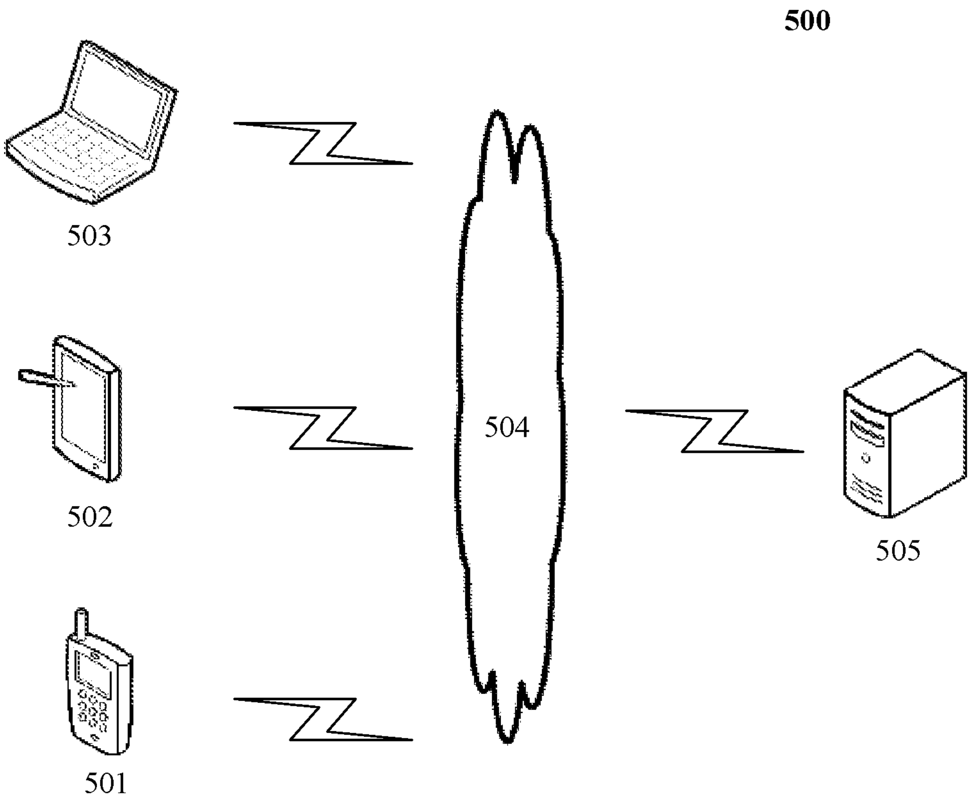
FIG. 5 is a diagram of an exemplary system architecture to which the embodiments of the present disclosure can be applied.

FIG. 5 illustrates an exemplary system architecture 500 applying the method for data verification or apparatus for data verification in this embodiment of the present disclosure.

As shown in FIG. 5, the system architecture 500 may include terminal devices 501, 502, and 503, a network 504, and a server 505. The network 504 is a medium configured to provide a communication link between the terminal devices 501, 502, and 503 and the server 505. The network 504 may have various types of connections, such as wired and wireless communication links, or fiber optic cables.

A user may use the terminal devices 501, 502, and 503 to interact with the server 505 through the network 504 to receive or send messages, etc. The terminal devices 501, 502, and 503 may be provided with various communication client applications, such as banking applications, digital currency applications, data verification applications, smart contract management applications, email clients, and social networking platforms (which are only examples).

The terminal devices 501, 502 and 503 may be various electronic devices having display screens and supporting web browsing, which include but not limited to a smart phone, a tablet personal computer, a portable laptop, a desk computer, etc.

The server 505 may be a server that provides various services, such as a backend management server (which is only an example) that supports data-to-be-verified sent by the user through the terminal devices 501, 502, and 503. The backend management server may perform a first verification on data-to-be-verified according to a received data verification request, where the data-to-be-verified includes the first contract parameter, the identifier of the smart contract, and the first execution result; process, after the successful first verification, the first contract parameter to obtain second contract parameter, and execute the smart contract according to the second contract parameter to obtain a second execution result; and send the second contract parameter, the identifier of the smart contract, and the second execution result to the consensus verification node for the processing such as consensus verification, and feed-back a processing result (e.g., a consensus verification result only as an example) to the terminal devices.

It should be noted that the data verification method provided in this embodiment of the present disclosure is generally executed by the server 505. Correspondingly, the data verification apparatus is generally set in the server 505.

It should be understood that the number of the terminal devices, networks and servers in FIG. 5 is for an illustrative purpose merely. According to implementation needs, there may be any number of terminal devices, networks and servers.

Figure 6:
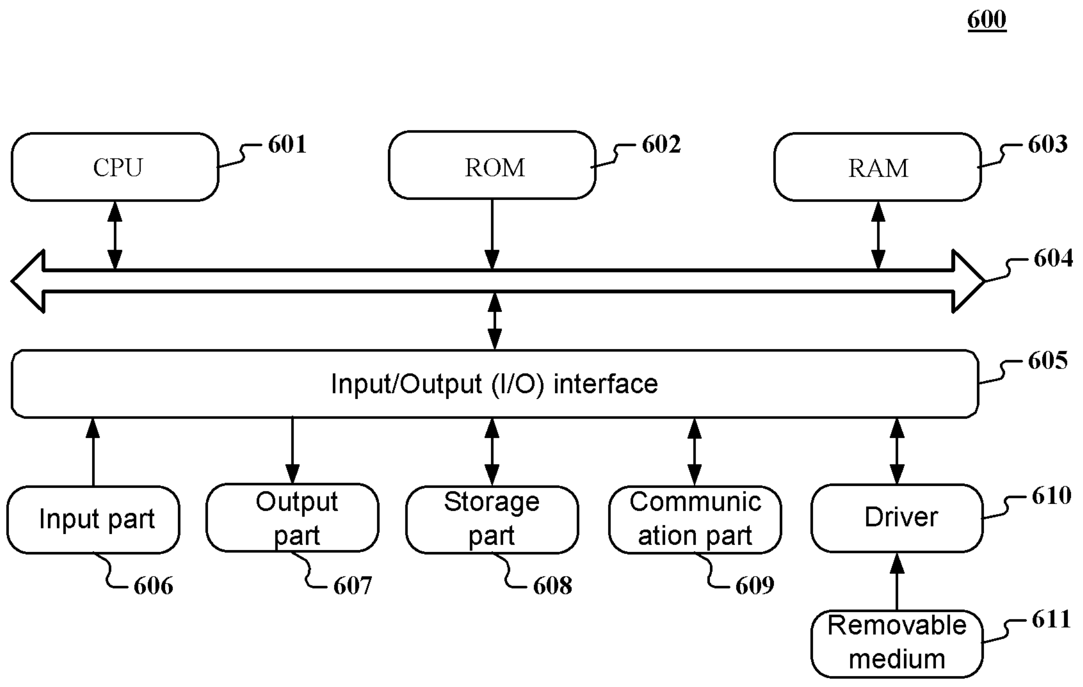
FIG. 6 is a structural schematic diagram of a computer system of a terminal device or server suitable for implementing the embodiments of the present disclosure.

Referring to FIG. 6 below, FIG. 6 illustrates a structural schematic diagram of a computer system 600 of a terminal device or server suitable for implementing this embodiment of the present disclosure. The terminal device or server shown in FIG. 6 is merely an example, which should not impose any limitations on functions and disclosure ranges of this embodiment of the present disclosure.

As shown in FIG. 6, the computer system 600 includes a central processing unit (CPU) 601 which may perform various proper actions and processing according to programs stored in a read only memory (ROM) 602 or programs loaded from a storage part 608 to a random access memory (RAM) 603. Various programs and data required for the operation of the system 600 may also be stored in the RAM 603. The CPU 601, the ROM 602, and the RAM 603 are connected with one another through a bus 604. An input/output (I/O) interface 605 is also connected to the bus 604.

Following components are connected to the I/O interface 605: an input part 606 including a keyboard, a mouse, etc.; an output part 607 including a cathode ray tube (CRT), a liquid crystal display (LCD), a speaker, etc.; the storage part 608 including a hard drive, etc.; and a network interface card communication part 609 including a local area network (LAN) card, a modem, etc. The communication part 609 performs communication processing through networks such as the Internet. A driver 610 is also connected to the I/O interface 605 according to needs. Removable media 611, such as a magnetic disk, an optical disk, a magneto-optical disk, and a semiconductor memory are installed on the driver 610 as needed, so that computer programs read therefrom are installed in the storage part 608 as needed.

Particularly, the foregoing process described with reference to the flowchart according to the embodiments of the present disclosure may be implemented as a computer software program. For example, an embodiment disclosed in the present disclosure includes a computer program product including a computer program stored on a computer-readable medium. The computer program includes program code for executing the method shown in the flowchart. In this embodiment, the computer program can be downloaded and installed, by the communication part 609, from the network, and/or be installed from the removable media 611. The computer program, when executed by the central processing unit (CPU) 601, executes the foregoing functions limited in the system of the present disclosure.

It should be noted that the computer-readable medium shown in the present disclosure may be a computer-readable signal medium, or a computer-readable storage medium, or any combination thereof. For example, the computer-readable storage medium may include but not limited to: electrical, magnetic, optical, electromagnetic, infrared or semiconductor systems, apparatuses or devices, or any combination thereof. More specific examples of the computer-readable storage medium may include but not limited to: an electrical connection with at least one wire, a portable computer disk, a hard drive, a random access memory (RAM), a read only memory (ROM), an erasable programmable read only memory (EPROM or a flash memory), fiber optics, a portable compact disc read only memory (CD-ROM), a light storage device, a magnetic storage device, or any proper combination of the above. In the present disclosure, the computer-readable storage medium may be any tangible medium including or storing a program, and the program may be used by an instruction execution system, apparatus or device, or used in conjunction with the instruction execution system, apparatus or device. However, in the present disclosure, the computer-readable signal medium may include data signals propagated in a baseband or propagated as a part of a carrier wave, which carry computer-readable program code. The propagated data signals may have a plurality of forms, and include but not limited to electromagnetic signals, optical signals or any proper combination of the above. The computer-readable signal medium may be any computer-readable medium except the computer-readable storage medium. The computer-readable medium may send, propagate or transmit programs used by the instruction execution system, apparatus or device or used in conjunction with the instruction execution system, apparatus or device. The program code included in the computer-readable medium may be transmitted by any proper medium including but not limited to wireless, a wire, an optical cable, radio frequency (RF), etc., or any above proper combinations.

The flowcharts and block diagrams in the accompanying drawings illustrate system architectures, functions, and operations possibly implemented by the system, method and computer program product according to the various embodiments of the present disclosure. In this regard, each block in the flowcharts or block diagrams may represent a module, a program segment, or part of the code, the module, program segment, or part of the code including at least one executable instruction for implementing specified logical functions. It should be noted that in some alternative implementations, functions marked in the blocks may also occur in an order different from that marked in the accompanying drawings. For example, two consecutively-represented blocks may actually be executed in parallel basically, but sometimes may also be executed in a reverse order, which depends on involved functions. It should be further noted that each block in the block diagrams or the flowcharts as well as a combination of the blocks in the block diagrams or the flowcharts may be implemented by using a dedicated hardware-based system that executes specified functions or operations, or using a combination of special hardware and computer instructions.

The units or modules described in the embodiments of the present disclosure may be implemented through software or hardware. The described units or modules may also be arranged in a processor. For example, it may be described as: a processor includes a first verification module, a contract execution module, and a second verification module. The names of the units or modules do not limit the units or modules in certain cases. For example, the first verification module may also be described as a "module for performing a first verification on data-to-be-verified".

According to another aspect, the present disclosure further provides a computer-readable medium. The computer-readable medium may be included in the device described in the foregoing embodiment, and may separately exist without being assembled in the device. The computer-readable medium carries at least one program. When the at least one program is executed by the device, the device is enabled to: perform a first verification on data-to-be-verified, where the data-to-be-verified includes the first contract parameter, the identifier of the smart contract, and the first execution result; process, after the first verification is passed, the first contract parameter to obtain the second contract parameter, and execute the smart contract according to the second contract parameter to obtain a second execution result; and send the second contract parameter, the identifier of the smart contract, and the second execution result to the consensus verification node for a consensus verification.

According to the method of this embodiment of the present disclosure, the first verification is performed on the data-to-be-verified, and the data-to-be-verified includes the first contract parameter, the identifier of the smart contract, and the first execution result; after the first verification is successful, the first contract parameter are processed to obtain the second contract parameter, and the smart contract is executed according to the second contract parameter to obtain the second execution result; and the second contract parameter, the identifier of the smart contract, and the second execution result are sent to the consensus verification node for the consensus verification, thereby realizing joint contract execution and verification by a contract verification platform composed of the plurality of verification nodes. The mechanism of multi-node joint verification ensures the accuracy of the contract execution result, and avoids the situation that an operating agency system is in charge of both contract execution and contract verification, causing the low credibility of verification of the smart contract, thereby improving the credibility of contract execution and verification.

The foregoing implementations do not limit the scope of protection of the present disclosure. Those skilled in the art should understand that various modifications, combinations, sub-combinations and substitutions may occur based on design demands and other factors. Any modification, equivalent replacement, improvement, etc., made within the spirit and principle of the present disclosure shall fall within the scope of protection of the present disclosure.

What is claimed is:

1. A method for data verification, comprising:

performing a first verification on data-to-be-verified, wherein the data-to-be-verified comprises a first contract parameter, an identifier of a smart contract, and a first execution result;

processing, after the first verification is passed, the first contract parameter to obtain a second contract parameter, and executing the smart contract according to the second contract parameter to obtain a second execution result;

sending the second contract parameter, the identifier of the smart contract, and the second execution result to consensus verification nodes for a consensus verification;

when the first verification is not successful, returning a verification failure, without performing the consensus verification, to cause a smart contract execution unit to perform rollback processing and execute the smart contract via mock operation, wherein the mock operation is a verification method where parameters are preset, and parameters of interest are input as arguments;

when processing is performed on a database and funds in a digital currency wallet, extracting latest desensitized wallet data from a wallet historical stacked repository of a verification platform composed of contract verification units of a plurality of operating agencies for a consensus verification, wherein a contract verification unit of an operating agency is a consensus verification node;

performing calculation processing according to a real operation record, to obtain a contract execution result;

appending calculated desensitized wallet information to wallet historical stacked repository, serving as a data basis for a next consensus verification.

2. The method as claimed in claim 1, wherein the performing a first verification on data-to-be-verified comprises:

acquiring the smart contract according to the identifier of the smart contract;

executing the smart contract according to the first contract parameter to obtain a third execution result;

comparing the third execution result with the first execution result for the first verification.

3. The method as claimed in claim 1, wherein each consensus verification node performs the consensus verification through the following method:

acquiring the smart contract according to the identifier of the smart contract;

executing the smart contract according to the second contract parameter to obtain a fourth execution result;

comparing the fourth execution result with the second execution result to obtain a second verification result.

4. The method as claimed in claim 1, wherein the consensus verification comprises:

determining whether a set condition for reaching set condition for reaching consensus has been met according to the second verification result of each consensus verification node;

in response to the set condition for reaching consensus being met, indicating the consensus verification is successful;

in response to the set condition for reaching consensus not being met, indicating that the consensus verification is failed.

5. A method for data verification, comprising:

sending, by a contract execution unit of an operating agency system, a first contract parameter, an identifier of the smart contract, and a first execution result to a contract verification unit of the operating agency system for a first verification;

performing the first verification by the contract verification unit of the operating agency system, processing, after the first verification is passed, the first contract parameter to obtain a second contract parameter, and executing a smart contract according to the second contract parameter to obtain a second execution result; sending the second contract parameter, the identifier of the smart contract, and the second execution result to consensus verification nodes;

performing, by the consensus verification nodes, a consensus verification according to the second contract parameter, the identifier of the smart contract, and the second execution result;

when the first verification is not successful, returning a verification failure, without performing the consensus verification, to cause a smart contract execution unit to perform rollback processing and execute the smart contract via mock operation, wherein the mock operation is a verification method where parameters are preset, and parameters of interest are input as arguments;

when processing is performed on a database and funds in a digital currency wallet, extracting latest desensitized wallet data from a wallet historical stacked repository of a verification platform composed of contract verification units of a plurality of operating agencies for a consensus verification, wherein a contract verification unit of an operating agency is a consensus verification node;

performing calculation processing according to a real operation record, to obtain a contract execution result;

appending calculated desensitized wallet information to wallet historical stacked repository, serving as a data basis for a next consensus verification.

6. The method as claimed in claim 5, wherein performing the first verification by the contract verification unit of the operating agency system comprises:

acquiring, by the contract verification unit of the operating agency system, the smart contract according to the identifier of the smart contract;

executing the smart contract according to the first contract parameter to obtain a third execution result;

comparing the third execution result with the first execution result for the first verification.

7. The method as claimed in claim 5, wherein each consensus verification node performs the consensus verification through the following method:

acquiring, by each consensus verification node, the smart contract according to the identifier of the smart contract;

executing the smart contract according to the second contract parameter to obtain a fourth execution result;

comparing the fourth execution result with the second execution result to obtain a second verification result.

8. The method as claimed in claim 5, wherein the consensus verification comprises:

determining whether a set condition for reaching set condition for reaching consensus has been met according to the second verification result of each consensus verification node;

in response to the set condition for reaching consensus being met, indicating the consensus verification is successful;

in response to the set condition for reaching consensus not being met, indicating that the consensus verification is failed.

9. An electronic device for data verification, comprising:

at least one processor; and a storage apparatus, configured to store at least one program, wherein when the at least one program is executed by the at least one processor, the at least one processor is enabled to implement following actions:

perform a first verification on data-to-be-verified, wherein the data-to-be-verified comprises a first contract parameter, an identifier of a smart contract, and a first execution result;

process, after the first verification is passed, the first contract parameter to obtain a second contract parameter, and execute the smart contract according to the second contract parameter to obtain a second execution result;

send the second contract parameter, the identifier of the smart contract, and the second execution result to consensus verification nodes for a consensus verification;

wherein when the first verification is not successful, return a verification failure, without performing the consensus verification, to cause a smart contract execution unit to perform rollback processing and execute the smart contract via mock operation, wherein the mock operation is a verification method where parameters are preset, and parameters of interest are input as arguments;

when processing is performed on a database and funds in a digital currency wallet, extract latest desensitized wallet data from a wallet historical stacked repository of a verification platform composed of contract verification units of a plurality of operating agencies for a consensus verification, wherein a contract verification unit of an operating agency is a consensus verification node;

perform calculation processing according to a real operation record, to obtain a contract execution result;

append calculated desensitized wallet information to wallet historical stacked repository, serving as a data basis for a next consensus verification.

10. A non-transitory computer-readable medium, storing a computer program, wherein the program, when executed by a processor, the processor is enabled to implement following actions:

perform a first verification on data-to-be-verified, wherein the data-to-be-verified comprises a first contract parameter, an identifier of a smart contract, and a first execution result;

process, after the first verification is passed, the first contract parameter to obtain a second contract parameter, and execute the smart contract according to the second contract parameter to obtain a second execution result;

send the second contract parameter, the identifier of the smart contract, and the second execution result to consensus verification nodes for a consensus verification;

wherein when the first verification is not successful, return a verification failure, without performing the consensus verification, to cause a smart contract execution unit to perform rollback processing and execute the smart contract via mock operation, wherein the mock operation is a verification method where parameters are preset, and parameters of interest are input as arguments;

when processing is performed on a database and funds in a digital currency wallet, extract latest desensitized wallet data from a wallet historical stacked repository of a verification platform composed of contract verification units of a plurality of operating agencies for a consensus verification, wherein a contract verification unit of an operating agency is a consensus verification node;

perform calculation processing according to a real operation record, to obtain a contract execution result;

append calculated desensitized wallet information to wallet historical stacked repository, serving as a data basis for a next consensus verification.

11. The method as claimed in claim 1, wherein desensitization comprises data substitution, data obfuscation, data randomization, and data masking.

12. The electronic device as claimed in claim 9, wherein the at least one processor is enabled to implement following actions:

acquire the smart contract according to the identifier of the smart contract;

execute the smart contract according to the first contract parameter to obtain a third execution result;

compare the third execution result with the first execution result as to perform the first verification.

13. The electronic device as claimed in claim 9, wherein the at least one processor is enabled to implement following actions:

acquire the smart contract according to the identifier of the smart contract;

execute the smart contract according to the second contract parameter to obtain a fourth execution result;

compare the fourth execution result with the second execution result to obtain a second verification result.

14. The electronic device as claimed in claim 9, wherein the at least one processor is enabled to implement following actions:

determine whether a set condition for reaching set condition for reaching consensus has been met according to the second verification result of each consensus verification node;

in response to the set condition for reaching consensus being met, indicate the consensus verification is successful;

in response to the set condition for reaching consensus not being met, indicate that the consensus verification is failed.

15. The electronic device as claimed in claim 9, wherein desensitization comprises data substitution, data obfuscation, data randomization, and data masking.

16. The method as claimed in claim 5, wherein the processing, by the contract verification unit of the operating agency system, the first contract parameter to obtain the second contract parameter comprises:

desensitizing the first contract parameter to obtain the second contract parameter by the contract verification unit of the operating agency system.

* * * * *